Figure 1:
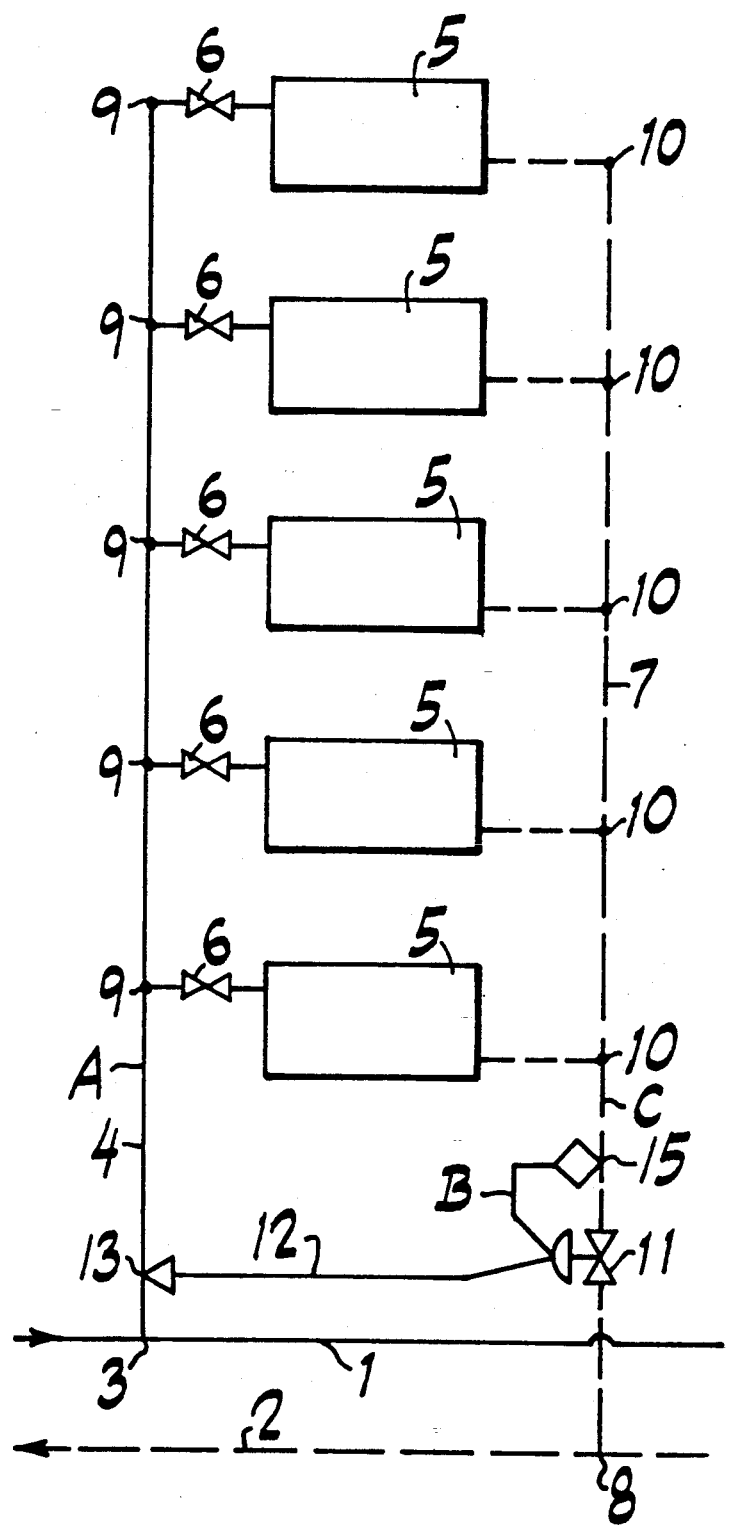

United States Patent
Moesby

[11] Patent Number: 5,178,324
[45] Date of Patent: Jan. 12, 1993

[54] METHOD OF REGULATING A CENTRAL OR DISTRICT HEATING PLANT BY MEANS OF A DIFFERENTIAL PRESSURE VALVE, AND UNIT FOR WORKING METHOD

[75] Inventor: Peter Moesby, Slagelse, Denmark

[73] Assignee: Frese Armatur A/S, Slagelse, Denmark

[21] Appl. No.: 602,279

[22] PCT Filed: Aug. 2, 1989

[86] PCT No.: PCT/DK89/00185
§ 371 Date: Nov. 12, 1990
§ 102(e) Date: Nov. 12, 1990

[87] PCT Pub. No.: WO90/01657
PCT Pub. Date: Feb. 22, 1990

[30] Foreign Application Priority Data
Aug. 5, 1988 [DK] Denmark .............. 4416/88

[51] Int. Cl.$^5$ ............................ F24D 3/00
[52] U.S. Cl. .......................... 237/8 R; 137/455
[58] Field of Search .......... 237/8 R, 56, 63, 8 C, 237/13; 236/92 R, 101 R, 102; 137/455, 458-463

[56] References Cited

U.S. PATENT DOCUMENTS

1,558,330 10/1925 Bain .................... 137/556

FOREIGN PATENT DOCUMENTS

| | | |
|---|---|---|
| 538837 | 1/1986 | Australia . |
| 0239753 | 10/1987 | European Pat. Off. . |
| 1054688 | 4/1959 | Fed. Rep. of Germany . |
| 1197208 | 7/1965 | Fed. Rep. of Germany . |
| 1253429 | 11/1967 | Fed. Rep. of Germany . |
| 2105889 | 8/1972 | Fed. Rep. of Germany . |
| 2110188 | 9/1972 | Fed. Rep. of Germany . |
| 2253462 | 5/1974 | Fed. Rep. of Germany . |
| 2305027 | 8/1974 | Fed. Rep. of Germany . |
| 2315045 | 10/1974 | Fed. Rep. of Germany . |
| 2756118 | 6/1979 | Fed. Rep. of Germany . |
| 3302514 | 7/1984 | Fed. Rep. of Germany . |
| 98383 | 7/1961 | Norway . |
| 221020 | 6/1968 | Sweden . |
| 345002 | 5/1972 | Sweden . |
| 451402 | 2/1987 | Sweden . |
| 473341 | 7/1969 | Switzerland . |

OTHER PUBLICATIONS

W. Hoffmann, "Hausanschlüsse für das Warmwasserfernheiznetz Stuttgart," Aug. 1956, Heiz.-Lüft.-Haustechn. 7, No. 8, pp. 130-131.
Samson AG, Einbau- und Bedienungsanleitung, Ausgabe Jan., 1988.

*Primary Examiner*—Henry A. Bennet
*Attorney, Agent, or Firm*—Kenyon & Kenyon

[57] ABSTRACT

A central heating plant (either single pipe or double pipe) supplies heat carrying fluid to several rooms, each having a radiator (5) provided with a thermostat valve (6). The plant has a differential pressure valve (11, 111) placed downstream of the radiators, with a closing device (24, 25) controlled by a membrane (23) for regulating the flow of heat carrying fluid in a passage (19) between an inlet (17) and an outlet (18). If the windows in several rooms are opened, the thermostat valves (6) will open, whereupon the differential pressure valve should regulate the combined flow, which a conventional valve cannot do since the pressure difference across the two surfaces of the membrane (23) is small even with full flow. This drawback is avoided by means of a differential pressure valve (11, 111) with an adjustable throttle (15) between the inlet (17) and the closing device (24, 25), and by adjusting the throttle, regardless of the pressure distribution, to allow the maximum amount of fluid to pass.

8 Claims, 7 Drawing Sheets

METHOD OF REGULATING A CENTRAL OR DISTRICT HEATING PLANT BY MEANS OF A DIFFERENTIAL PRESSURE VALVE, AND UNIT FOR WORKING METHOD

The invention relates to a method of regulating a central or district heating plant provided with a differential pressure valve for circulating a heat carrying liquid, such as water, in a building with several rooms, each of which has at least one radiator controlled by a thermostat valve, said differential pressure valve being placed after the radiators in the direction of flow and having a closing device controlled by a membrane for regulating the flow of the heat carrying liquid through a passage between an inlet and an outlet.

In central heating plants it is important that the water is distributed through the plant in a previously calculated proportion in such a way that the dimensioned heat requirements of the individual radiators are taken into consideration.

It is also important that the heat carrying liquid remains in the plant for long enough to allow an adequate amount of heat to be dissipated to the rooms in the building which is to be heated by the plant. This is enabled by means of a differential pressure valve placed in the individual branches of the plant, which valve can regulate the flow of the heat carrying liquid.

Furthermore, it is important that the differential pressure across the individual radiators is so small that noise is not generated in the valves, because such noise may cause inconvenience, directly or by transmission through the piping system.

In the individual rooms the flow of the heat carrying liquid through the radiator or through each radiator is controlled by means of thermostat valves which, depending upon the room temperature, can open more or less to permit flow through the radiator or radiators respectively in such a way that the emission of heat to the room can be kept within the limits, which are determined by the accuracy of the thermostat valves, and the temperature, which the user of the room has decided to maintain, by adjustment of the thermostat valve or valves.

In this normal function of the plant the thermostat valves control the system, and the differential pressure valve assumes its previously fixed setting, which is combined number of thermostat valves will cause an appropriate pressure drop across the plant.

However, in a plant like this a situation will often arise which will deviate from this predetermined normal function.

This may for example occur when early in the morning when the cleaning personnel open the windows in several rooms to air the rooms prior to the arrival of the users of the individual rooms at normal working hours.

When the window or the windows are opened in a room in which there are radiators provided with thermostat valves these ought to be turned off to the flow of the heat carrying liquid.

Experience shows that the radiators are rarely turned off, and therefore several hours may pass with the windows left open, whereby the thermostat valves open fully for each radiator, especially at low outdoor temperature.

In this situation it is the differential pressure valve which must control the combined flow through the plant, but this cannot be accomplished since the pressure difference between the two surfaces of the membranes is small, even with full flow through the valve.

Therefore in this abnormal but nevertheless often recurring situation, a disproportionately large amount of the heat carrying liquid will flow through the plant with a poor economy as a consequence.

The purpose of the invention is to counter the above mentioned drawback, and this purpose is achieved through the method in question, which method according to the invention is characterized in that the differential pressure valve is provided with an adjustable throttle between the inlet and the closing device, and that the throttle is adjusted to allow a maximum amount of liquid to pass, regardless of the state of distribution of the pressure in the plant.

By providing the differential pressure valve with the said adjustable throttle the total amount of heat carrying liquid through the plant can be limited even if all of the thermostat valves are opened at a maximum, which means that the throttling, which normally takes place in the plant by the combined effect of a plurality of thermostat valves, is transferred down to the differential pressure valve. In this way a constant loss of pressure is provided across the thermostat valves and/or the throttle In the differential pressure valve, regardless of whether the thermostat valves are more or less open.

The invention also relates to a central or district heating plant for use in the implementation of the method according to the invention, said plant being designed for conducting a heat carrying liquid, such as water, and comprising several radiators, each provided with a thermostat valve, at least one radiator being placed in each room in a building, and a differential pressure valve being placed after the radiators in the direction of flow, said valve having a closing device controlled by a membrane for regulating the flow of the heat carrying liquid through a passage between an inlet and an outlet, and said plant according to the invention being characterized in that the differential pressure valve has an adjustable throttle between the inlet and the closing device.

The subclaims indicate ways, respectively means, for the implementation of the method. The usefulness of these will appear from the following description.

Figure 2:
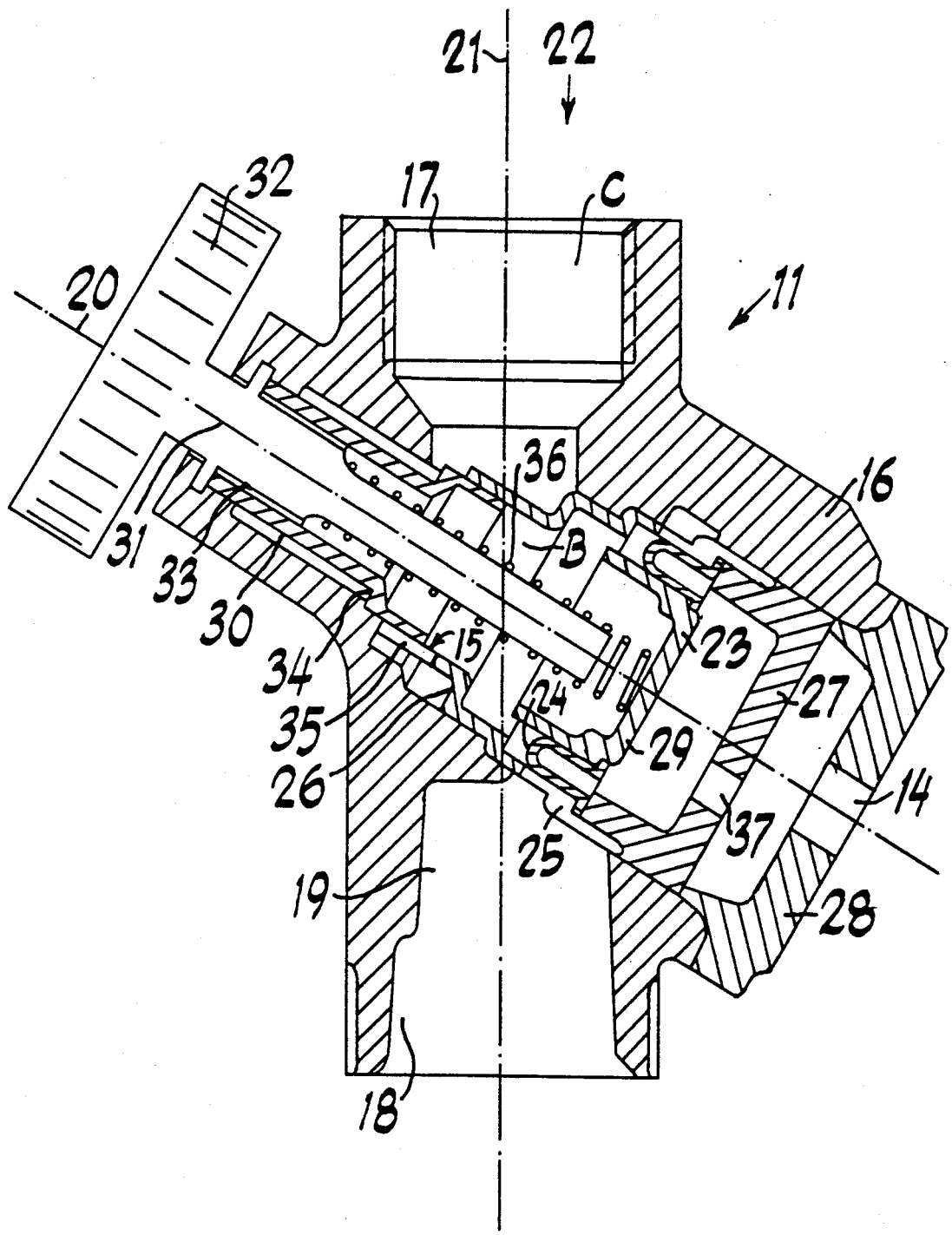
Figure 3:
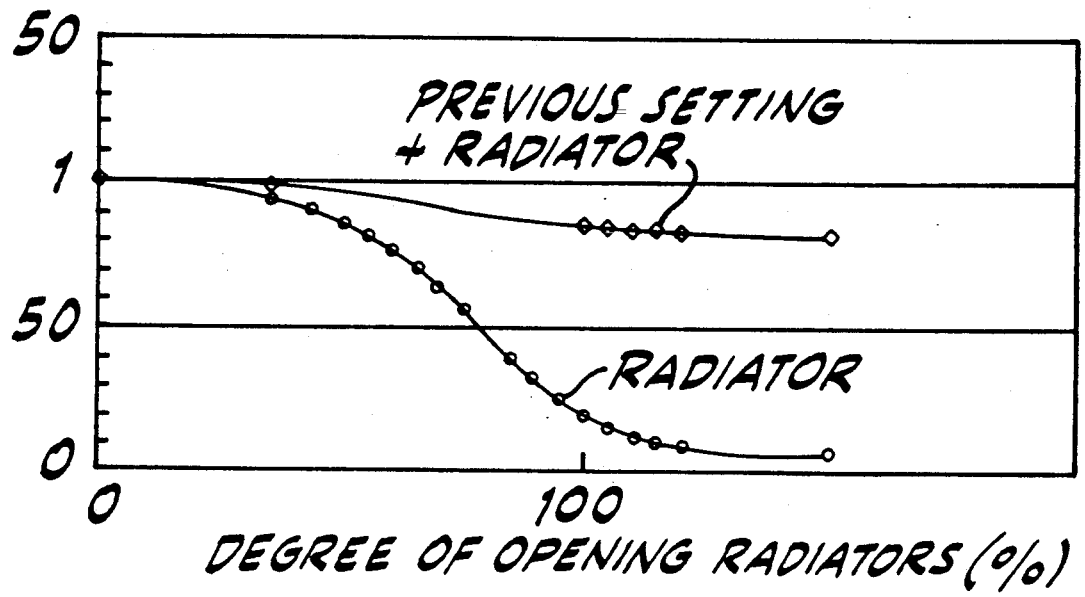
Figure 4:
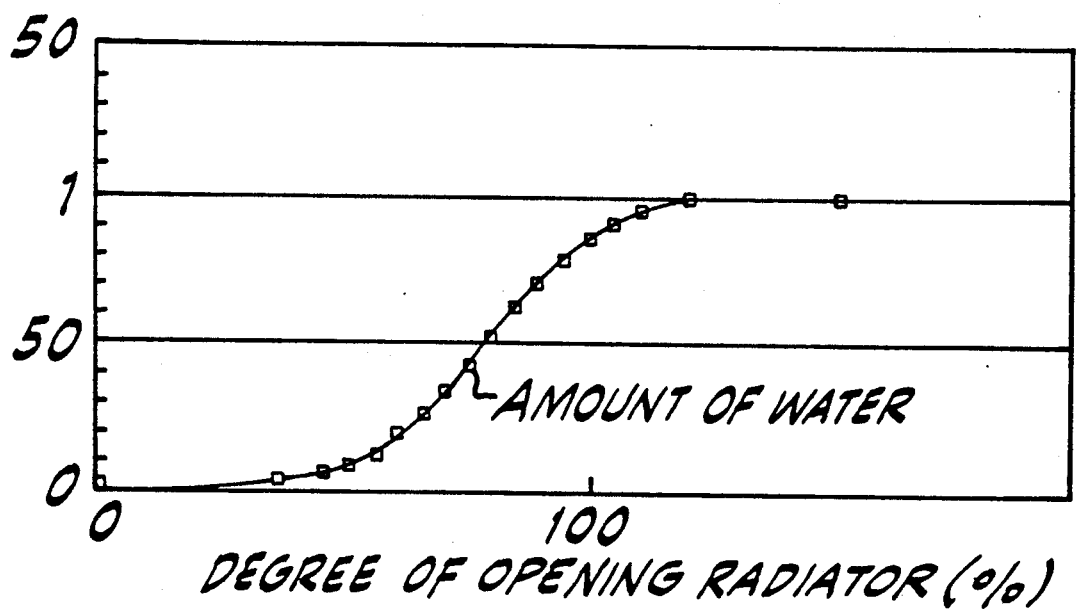
Figure 5:
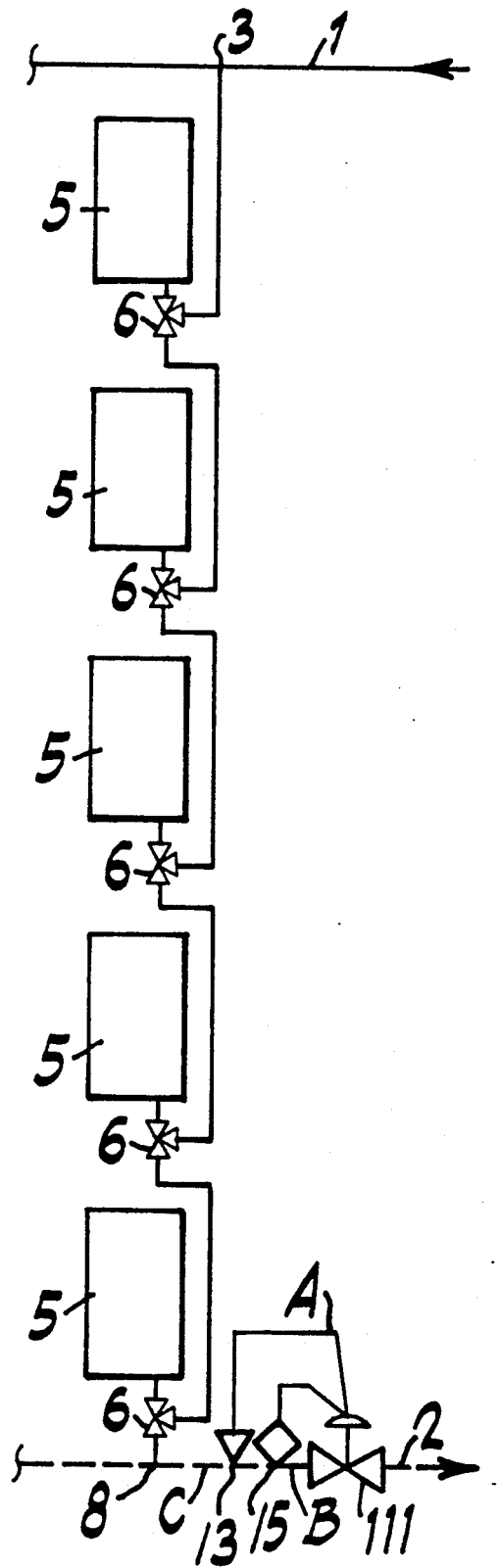
Figure 6:
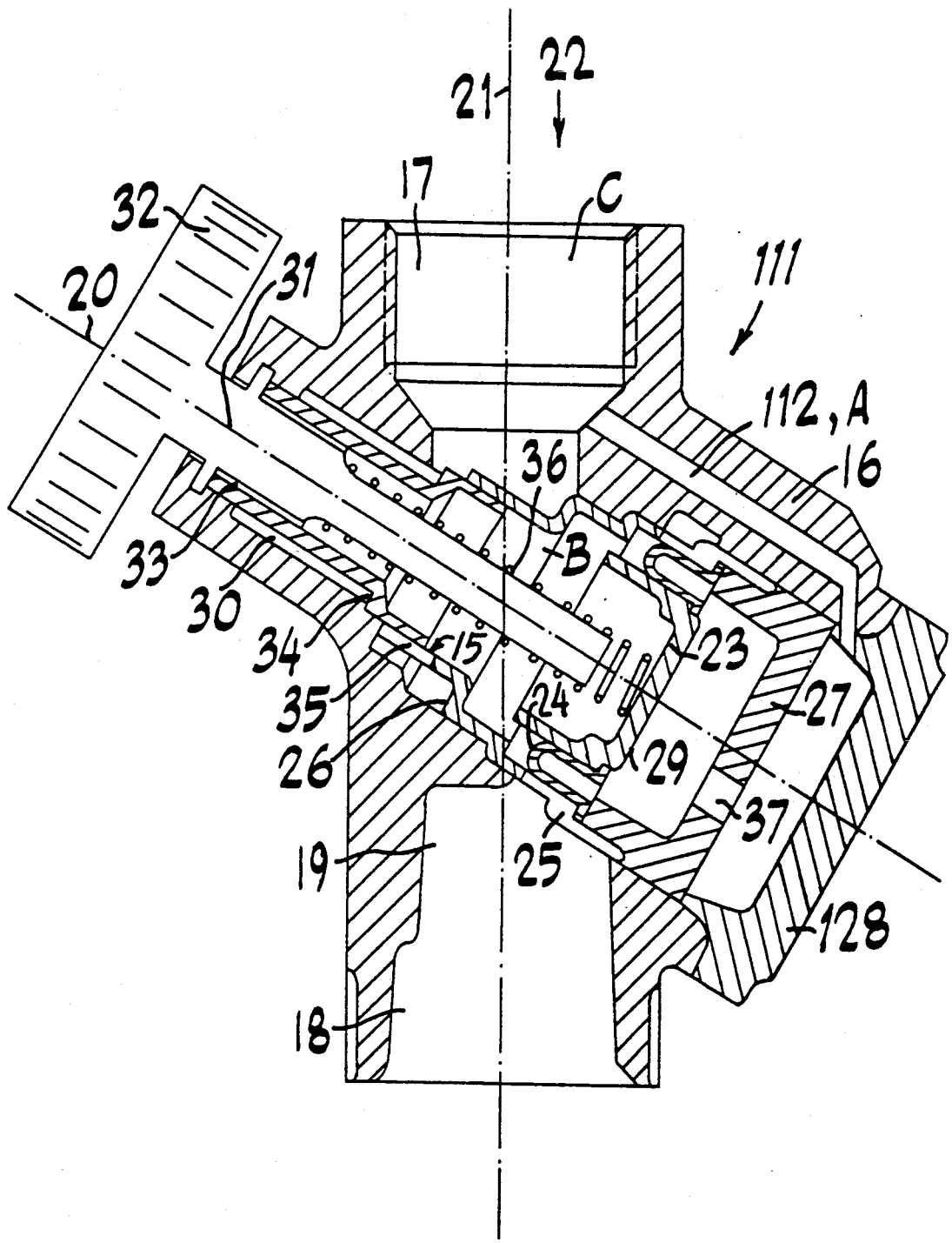
Figure 7:
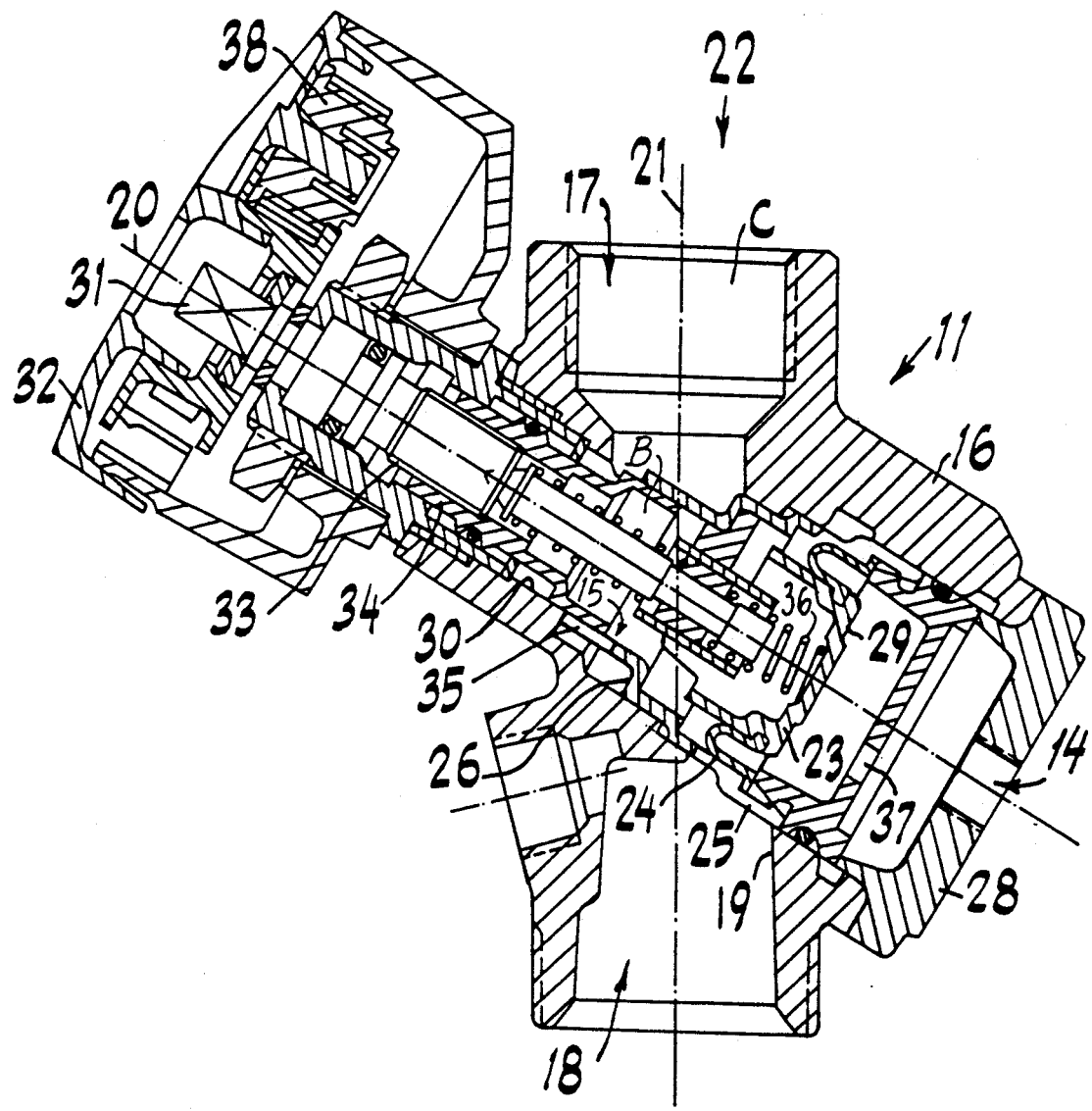
Figure 8:
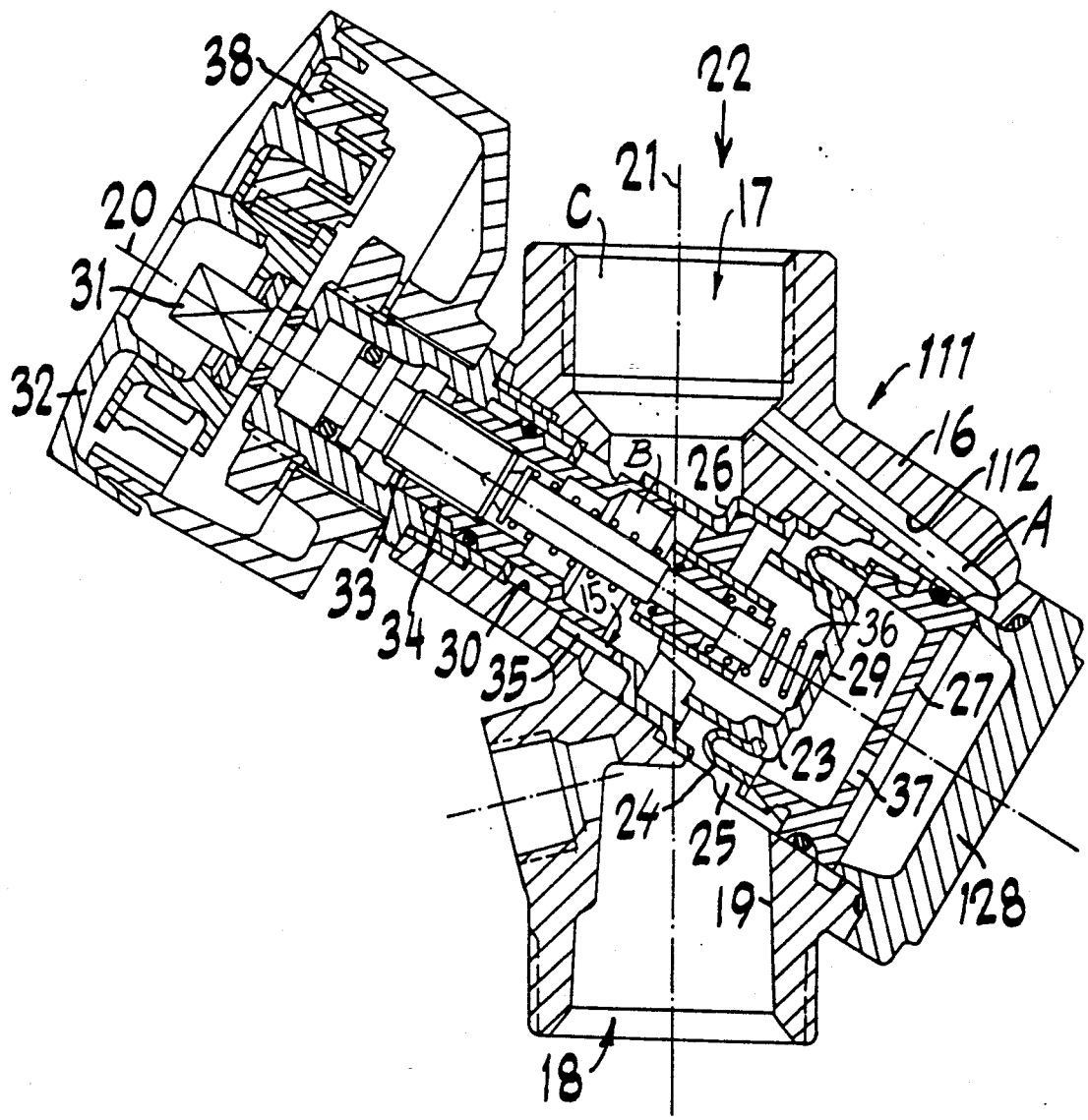

The method will be explained in more detail in the following with reference to the drawings which illustrate a plant for use in the implementation of the method, and in which FIG. 1 is a schematic view of a double pipe central or district heating plant according to the invention, FIG. 2 is a schematic view of a differential pressure valve according to the invention for use in the double pipe plant shown in FIG. 1, FIG. 3 shows the distribution of differential pressures in the plant shown in FIG. 1, FIG. 4 shows the regulation of the amount of water in the same plant, FIG. 5 is a schematic view of a single pipe central or district heating plant according to the invention, FIG. 6 is a schematic view of a differential pressure valve according to the invention for use in the single pipe plant shown in FIG. 5, FIGS. 7 and 8 show preferred embodiments of the differential pressure valves shown in FIG. I and in FIG. 5, respectively.

A double pipe central or district heating plant according to the invention comprises a main supply pipe 1 and a main return pipe 2 which conduct a heat carrying liquid, such as water, from and back to, respectively, a boiler unit (not shown in the drawing) of generally known type.

From a branching point 3 a side supply pipe 4 conducts the heat carrying fluid to a number of radiators 5, each of which is provided with a thermostat valve 6, which according to its setting and the temperature of the room in which the radiator 5 is placed, can control the flow of the heat carrying liquid through the radiator 5.

The thermostat valves 6 are of a generally known kind and are not part of the invention and their construction will therefore not be described in detail.

A side return pipe 7 conducts the heat carrying liquid back to the main return pipe 2 at a connection point 8.

In FIG. 1 the supply pipes 1 and 4 are shown in full lines, while the return pipes 2 and 7 are shown in dotted lines.

The radiators 5 are connected to the side supply pipe 4 and the side return pipe 7 at connection points 9 and 10, respectively.

A differential pressure valve 11 is inserted in the side return pipe 7 between the connection point 8 and the connection point 10 immediately preceding in the direction of flow. The construction of this valve will be described in more detail in the following.

Furthermore a pipe 12 is provided in the plant in the shape of a capillary tube extending between a first point of reference 13 and a connection 14 on the differential pressure valve 11, which reference point 13 is located on the side supply pipe 4 between the branching point 3 and the first connection point 9 for a radiator 5 in the direction of flow.

Between the above mentioned immediately preceding connection point 10 and the differential pressure valve 11 is provided a throttle 15, the area of the passage of which is adjustable.

The side pipes 4 and 7, the radiators 5, the thermostat valves 6, and the differential pressure valve 11 in combination constitute a branch off of the main pipes 1 and A branch of this kind is for example intended for the heating of a number of rooms which are placed above each other in a building, such as a residential property or an office building.

A branch of the kind described may be placed at each entrance or stairway in the building.

The differential pressure valve 11 is shown schematically in FIG. 2 and comprises a housing 16 with an inlet 17 and an outlet 18, which form the end points of a passage 19 through the housing 16. The inlet 17 is provided with means, for example a screw thread or a flange, by which it can be connected to the return branch pipe 7 in a flowtight way, and the outlet is adapted to be connected to the main return pipe 2 in a similar way. The arrow 22 shows the direction of flow.

The housing is furthermore provided with a bore 30, the axis 20 of which preferably, but not necessarily, extends at an angle in relation to the axis 21 of the passage 19.

Coaxially with the axis 20 of the bore 30 a membrane device is provided which can be controlled by a differential pressure.

The membrane device consists of a membrane 23 which is connected with a bellows 24 of elastic material. The bellows 24 can be described as a short tube, one end of which, at a radial distance, is turned back upon the other end, whereupon the radially outer part is tightly secured to the wall of the bore 30 and the radially inner part is tightly connected to the membrane 23. During the displacement of the membrane 23 forwards and back in the direction of the axis 20 of the bore 30 the bellows will fold or roll upon itself to a larger or smaller degree whereby the radially outer part can become longer or shorter and roll across some axially extending slits 25 in the foremost end of a bushing 26 with a first end and an opposite second end, said bushing being referred to in the following as the second bushing. The slits 25 are placed at regular intervals along the periphery of the second bushing 26.

The connection of the radially outer part of the bellows 24 is effected by means of a membrane holder 27 which is secured in the bore 30 by means of a cap 28 which for example can be fastened to the housing 16 by screws or similar means of attachment.

The cap 28 carries the above mentioned connection 14 for the pipe 12. A hole 37 has been drilled in the membrane holder 27 in such a way that a pressure in the branch pipe 12 can act upon a first surface 29 of the membrane 23, said first surface facing away from the passage 19 in the housing 16.

The second bushing 26 is mounted immovably and tightly in the bore 30 and extends through the passage 19. It is furthermore sealed in the housing 16 in such a way that the flow of a heat carrying medium through the passage 19 can take place only when the membrane is in positions where the bellows 24 more or less uncovers the slits 25 in the second bushing 26.

At the opposite end of the bushing 30 a stem 31 with a handle 32 is placed rotatably, said handle having a surface with friction enhancing means, such as a knurl, so that the handle 32 can easily be rotated, and the stem 31 can thereby be rotated around its longitudinal axis, which is coincident with the axis 20 of the bore 30.

The stem 31 is provided, on part of its surface of revolution, with a thread 33 which can co-operate with a thread in a bushing 34, which in the following will be referred to as the first bushing. The bushing 34 is mounted slidably in the bore 30. The stem 31 is mounted immovably lengthwise in the housing 16, and it will be understood that turning the handle 32 will result in a displacement lengthwise of the first bushing 34 towards or away from the membrane device.

The outer diameter of the first bushing 34 fits with a tight, sliding co-operation inside the other end of the second bushing 26, said other end being provided with lengthwise passages or perforations 35 which are distributed at equal intervals around the periphery of the second bushing.

By means of the above mentioned turning of the handle 32, the first bushing 34 can be displaced inside the second bushing 26 between a first position where the free end part of the first bushing 34 will close the above mentioned lengthwise passages 35 in the wall of the second bushing 26, and a second position where a free flow is permitted through the passages.

With the differential pressure valve 11 being mounted in the plant as shown in FIG. 1 it is possible by means of the handle 32 to adjust the first bushing 32 in relation to the second bushing 26 in such a way that the end part of the first bushing 34 will expose an appropriate area of the passages 35.

This area forms the above mentioned throttle 15 which thus is built into the differential pressure valve 11.

A membrane spring 36 is mounted around the stem 31 and is adapted to act upon the membrane in the direction of the cap 28, that is, towards the position in which the membrane device permits the largest flow possible.

The pressure which during the flow of the heat carrying liquid through the differential pressure valve is present in the region between the passages 35 and the slits 25 will be compared by the membrane to the pressure which is sensed at the point 13, reference point A, in the side supply pipe 4 by means of the pipe 12, whereby the membrane 23 adjusts itself in its longitudinal direction so that the differential pressure, depending upon the spring characteristic of the membrane spring 36, will be adjusted to an appropriate amount of flow.

Furthermore, the pressure in the side return pipe 7 after the nearest preceding connection point 10, is measured at a point, reference point C, in the inlet 17 of the differential pressure valve 11.

The operation of the plant shown in FIG. 1 will be explained in the following with reference to the curves shown in FIGS. 3 and 4, which are obtained by simulation in a model.

The regulation characteristics of the differential pressure valve is shown in FIG. 3 as a function of the degree of opening of the thermostat valves 6 in the radiators 5 in the side pipes 4, 7. Thus 100% will correspond to the state of the dimensioning, and degrees of opening beyond that will correspond to a period of warming, for example following a night with lower temperatures or following the above described state in which the windows have been opened in cold weather without closing of the thermostat valves 6 at the same time.

FIG. 3 shows, respectively, the distribution of the differential pressure across the radiators in the side pipes 4, 7, that is, between the reference points A and C, and the regulated differential pressure across the radiators 5 and the throttle 15 combined, that is, between the reference points A and B.

It will be observed that the differential pressure across the radiators 5 is always less than 1 mVs (water column pressure), and that the differential pressure across the throttle 15, which is indicated by the difference between the curves, remains substantially constant at degrees of opening greater than 100%.

FIG. 4 shows the regulated amount of water in the side pipes 4, 7 and it will be observed that the amount of water is substantially constant at a degree of opening greater than 100%.

A single pipe central or district heating plant according to the invention is shown in FIG. 5 in which the same reference numbers are used for parts corresponding to the same parts in FIG. 1.

The plant has a main supply pipe 1, a main return pipe 2, a branching point 3, a connection point 8, radiators 5 with thermostat valves 6, a differential pressure valve 111 and a throttle 15.

The thermostat valves are of a slightly different arrangement than the ones used in FIG. 1, as they are designed to allow the heat carrying liquid to flow on to the next thermostat valve 6 in the direction of flow.

The thermostat valves 6 are of a generally known kind and are not a part of the invention, and their construction will therefore not be described in detail.

The differential pressure valve 111 (shown in detail in FIG. 6) differs from the above described differential pressure valve 11 in that it does not have a connection corresponding to the connection 14 for the pipe 12 in the double pipe plant.

Instead, a passage 112 is provided between the inlet 17 and the space between the membrane holder 27 and a cap 128, said passage 112 constituting the reference point A in the differential pressure valve 111.

The reference point B is located in the region between the perforations 35 and the slits 25 as is the case in the differential pressure valve 11.

It will be understood that although the differential pressure valves 11 and 111 differ slightly from each other and that it is a question of two different embodiments of central or district heating plants, the differential pressure valve 111 will produce the same effect as the differential pressure valve 11 in the double pipe plant, and it is therefore regarded as unnecessary to explain the function of the single pipe plant.

FIGS. 7 and 8 show preferred embodiments of differential pressure valves 11 and 111 according to the invention for use, respectively, in double pipe and single pipe central or district heating plants.

FIGS. 7 and 8 show the numerous components which form parts of the differential pressure valves according to the invention, said components comprising nuts, seals, screws and a planet gear 38 in the handle 32 which constitutes a gear for the turning of the spindle in such a way that the displacement of the first bushing 34 can take place with the accuracy necessary.

I claim:

1. A method for regulating a central or zone heating plant, the method including circulating a heat carrying fluid from an upstream supply line, through at least one radiator provided with a thermostat valve in each of a plurality of rooms in a building, to a downstream return lines; placing a differential pressure valve in the downstream return line so that the heat carrying fluid returning from the radiators flows through a passage between an inlet and an outlet of the differential pressure valve, the differential pressure valve having a closing device controlled by a membrane for regulating the flow of the heat carrying fluid through the passage between the inlet and the outlet; providing a throttle in the return line upstream of the closing device; applying a pressure obtained from a first location upstream of the throttle to a first side of the membrane; and applying a pressure obtained from a second location downstream of the throttle to a second side of the membrane opposite to the first side, wherein the improvement comprises locating the adjustable throttle in the passage of the differential pressure valve between the inlet and the closing device, and adjusting the throttle to allow a maximum amount of fluid to pass through the differential pressure valve, regardless of the state of distribution of pressure in the plant.

2. A method according to claim 1 wherein said second location is in the passage of the differential pressure valve between the throttle and the closing device.

3. A method according to claim 1 or 2, in which the plant is a double pipe plant, and said first location is in the supply line upstream of the radiators.

4. A method according to claim 1 or 2 in which the plant is a single pipe plant, and said first location is in the return line downstream of the radiators.

5. A central or zone heating plant for transporting a heat carrying liquid to a plurality of rooms in a building, said plant comprising an upstream supply pipe, a downstream return pipe, at least one radiator in each of the plurality of rooms connected between the supply pipe and the return pipe, a thermostat valve for each radiator, a differential pressure valve placed in the downstream return line, said differential pressure valve having an inlet, an outlet, a passage connecting the inlet to the outlet, a closing device located in the passage, a membrane operatively connected to the closing device for regulating the flow of heat carrying liquid in the passage between the inlet and the outlet, and a throttle disposed in the return pipe upstream of the differential pressure valve wherein the improvement comprises the throttle being an adjustable throttle located in the passage of the differential pressure valve between the inlet and the closing device.

6. A heating plant according to claim 5, wherein the throttle comprises a first bushing having an end part, a second bushing having a wall provided with lengthwise perforations, and a threaded spindle operatively engaged with the first bushing so as to displace the first bushing axially in the second bushing between a first position, in which the end part of the first bushing closes the lengthwise perforations, and a second position in which the said perforations are free to permit passage of the heat carrying fluid between the inlet and the closing device leading to the outlet.

7. A plant according to claim 5 or 6, wherein the plant is of the double pipe type and comprises a capilary tube extending from a first point in the supply line upstream of the radiators, to a connection communicating with a first surface of the membrane of the differential pressure valve, said surface facing away from the closing device.

8. A plant according to claim 5 or 6, said plant being of the single pipe type wherein the first surface of the membrane is disposed in the passage of the differential pressure and communicates with the inlet.

* * * * *

UNITED STATES PATENT AND TRADEMARK OFFICE
CERTIFICATE OF CORRECTION

PATENT NO. : 5,178,324
DATED : January 12, 1993
INVENTOR(S) : Peter MOESBY

It is certified that error appears in the above-identified patent and that said Letters Patent is hereby corrected as shown below:

Col. 2, line 63, change "FIG. I" to --FIG. 1--

Col. 6, line 31, change "lines; to --line;--

Col. 8, line 6, change "capilary" to --capillary--

Col. 8, line 8, delete the comma after "radiators"

Signed and Sealed this

Eighteenth Day of January, 1994

Attest:

BRUCE LEHMAN

Attesting Officer

Commissioner of Patents and Trademarks